US009563949B2

(12) United States Patent
Hwang et al.

(10) Patent No.: US 9,563,949 B2
(45) Date of Patent: Feb. 7, 2017

(54) METHOD AND APPARATUS FOR MEDICAL IMAGE REGISTRATION

(71) Applicants: Samsung Electronics Co., Ltd., Suwon-si (KR); Korea Advanced Institute of Science and Technology, Daejeon (KR)

(72) Inventors: Young-kyoo Hwang, Seoul (KR); Jung-bae Kim, Hwaseong-si (KR); Won-chul Bang, Seongnam-si (KR); Do-kyoon Kim, Seongnam-si (KR); Jong-beom Ra, Daejeon (KR); Woo-hyun Nam, Daejeon (KR); Chi-jun Weon, Daejeon (KR)

(73) Assignees: Samsung Electronics Co., Ltd., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 125 days.

(21) Appl. No.: 13/912,641

(22) Filed: Jun. 7, 2013

(65) Prior Publication Data

US 2014/0072196 A1 Mar. 13, 2014

(30) Foreign Application Priority Data

Sep. 7, 2012 (KR) .................... 10-2012-0099548

(51) Int. Cl.
*G06T 7/00* (2006.01)
(52) U.S. Cl.
CPC .......... *G06T 7/0016* (2013.01); *G06T 7/0028* (2013.01); *G06T 2207/10081* (2013.01);
(Continued)

(58) Field of Classification Search
CPC ............... A61B 2019/5289; A61B 2019/5276;
A61B 2019/5295; A61B 2019/5238; A61B 2019/524; A61B 6/032; A61B 6/5247; A61B 6/466; A61B 6/5235; A61B 8/5238; A61B 8/5261; G06T 2207/30004; G06T 2207/10072; G06T 2207/10136; G06T 2207/10088; G06T 2207/10132; G06T 2207/10081; G06T 2207/10116; G06T 2207/20221; G06T 2207/30204; G06T 7/0028; G06T 7/0032; G06T 7/0024; G06T 7/0026; G06T 17/00; G06T 19/00; G06T 19/003; G06T 2200/04; G06T 7/0016; G06T 2207/10084; G06T 2207/10104; G06T 2207/30056; G06T 2207/30084; G06T 2207/30101

(Continued)

(56) References Cited

U.S. PATENT DOCUMENTS

2006/0253031 A1 11/2006 Altmann et al.
2008/0085042 A1* 4/2008 Trofimov ............... A61B 5/042
382/128

(Continued)

FOREIGN PATENT DOCUMENTS

JP 3878456 B2 11/2006
JP 3878462 B2 11/2006
(Continued)

OTHER PUBLICATIONS

D.-G. Kang et al., "Registration of CT-ultrasound images of the liver based on efficient vessel-filtering and automatic initial transform prediction," *International Journal of Computer Assisted Radiology and Surgery*, vol. 1, Issue 1 Supplement, Jun. 2006, pp. 54-57.

Primary Examiner — Vu Le
Assistant Examiner — Kenny Cese
(74) Attorney, Agent, or Firm — NSIP Law

(57) ABSTRACT

A method of medical image registration includes obtaining a first medical image generated before a medical surgery;

obtaining a second medical image generated in real time during the medical surgery; extracting landmark points of at least two adjacent anatomical objects recognizable in the second medical image among a plurality of anatomical objects near an organ of interest of a patient from the first medical image and the second medical image; and registering the first medical image and the second medical image based on a geometrical correlation among the adjacent anatomical objects indicated by the landmark points of the first medical image and a geometrical correlation among the adjacent anatomical objects indicated by the landmark points of the second medical image.

17 Claims, 8 Drawing Sheets

(52) U.S. Cl.
CPC ............... *G06T 2207/10084* (2013.01); *G06T 2207/10088* (2013.01); *G06T 2207/10104* (2013.01); *G06T 2207/10136* (2013.01); *G06T 2207/30056* (2013.01); *G06T 2207/30084* (2013.01); *G06T 2207/30101* (2013.01)

(58) Field of Classification Search
USPC .................................................. 382/128–132
See application file for complete search history.

(56) References Cited

U.S. PATENT DOCUMENTS

| | | | |
|---|---|---|---|
| 2008/0095421 A1 | 4/2008 | Sun et al. | |
| 2008/0247622 A1* | 10/2008 | Aylward | A61B 19/52 382/131 |
| 2008/0262345 A1* | 10/2008 | Fichtinger | A61B 6/504 600/426 |
| 2009/0054772 A1 | 2/2009 | Lin et al. | |
| 2009/0275831 A1 | 11/2009 | Hall et al. | |
| 2010/0239144 A1* | 9/2010 | Fichtinger | A61B 5/418 382/131 |
| 2011/0160566 A1 | 6/2011 | Petropoulos et al. | |
| 2011/0178389 A1 | 7/2011 | Kumar et al. | |

FOREIGN PATENT DOCUMENTS

| | | |
|---|---|---|
| KP | 10-2009-0127091 A | 12/2009 |
| KP | 10-2009-0127100 A | 12/2009 |
| KP | 10-2009-0127101 A | 12/2009 |
| KP | 10-2011-0013026 A | 2/2011 |
| KP | 10-2011-0013738 A | 2/2011 |

* cited by examiner

METHOD AND APPARATUS FOR MEDICAL IMAGE REGISTRATION

CROSS-REFERENCE TO RELATED APPLICATIONS

This application claims the benefit of Korean Patent Application No. 10-2012-0099548 filed on Sep. 7, 2012, in the Korean Intellectual Property Office, the disclosure of which is incorporated herein in its entirety by reference.

BACKGROUND

1. Field

This application relates to methods and apparatuses for registering a plurality of medical images.

2. Description of Related Art

Recent developments in medical technologies enable acquisition of high-resolution medical images and minute manipulation of medical equipment. For example, surgical methods for making a small incision, inserting a catheter or a medical needle into a blood vessel or a desired location of a body, and observing the interior of the body using medical imaging equipment, and performing treatment have been developed. Such methods are referred to as "image-guided surgeries" or "interventional imaging surgeries." A surgeon determines locations of organs or lesions from images. Furthermore, since a patient breathes or moves during a surgery, it is necessary to determine changes caused thereby. Therefore, it is necessary for a surgeon to determine breathing and movement of a patient based on real-time images quickly and precisely to perform a surgery, where it is not easy to recognize shapes of organs and lesions with the naked eye. For example, in the case of a liver cancer patient, the shapes of the liver and lesions cannot be recognized based on ultrasound images obtained in real time during surgery. On the other hand, although images obtained via magnetic resonance imaging (MRI) or computed tomography (CT) enable clear recognition of the shapes of the liver and lesions of a liver cancer patient, the images cannot be obtained in real time during surgery.

SUMMARY

In one general aspect, a method of medical image registration includes obtaining a first medical image generated before a medical surgery; obtaining a second medical image generated in real time during the medical surgery; extracting landmark points of at least two adjacent anatomical objects recognizable in the second medical image among a plurality of anatomical objects near an organ of interest of a patient from the first medical image and the second medical image; and registering the first medical image and the second medical image based on a geometrical correlation among the adjacent anatomical objects indicated by the landmark points of the first medical image and a geometrical correlation among the adjacent anatomical objects indicated by the landmark points of the second medical image.

The extracting of the landmark points may includes extracting a part of the landmark points of the first medical image and the second medical image from a first anatomical object among the adjacent anatomical objects; and extracting a remaining part of the landmark points of the first medical image and the second medical image from a second anatomical object among the adjacent anatomical objects.

The extracting of the landmark points may include extracting a part of the landmark points of the first medical image and the second medical image from a centerline of a blood vessel near the organ of interest; and extracting a remaining part of the landmark points of the first medical image and the second medical image from points on a boundary surface of the organ of interest that are closest to the landmark points extracted from the centerline of the blood vessel.

The registering of the first medical image and the second medical image may include calculating a first vector indicating the geometrical correlation among the adjacent anatomical objects using coordinates of the landmark points of the first medical image; calculating a second vector indicating the geometrical correlation among the adjacent anatomical objects using coordinates of the landmark points of the second medical image; and matching a coordinate system of the first medical image and a coordinate system of the second medical image based on a difference between the first vector and the second vector.

The matching of the coordinate systems may include calculating a transformation matrix for transforming the first vector or the second vector so that the difference between the first vector and the second vector is less than or equal to a predetermined threshold value; matching the coordinate system of the first medical image and the coordinate system of the second medical image based on the transformation matrix; and performing at least one of scaling, moving and rotating the first medical image or the second medical image based on matched coordinates of the first medical image and the second medical image.

The matching of the coordinate system may further include selecting boundary regions indicating silhouettes of the adjacent anatomical objects in the first medical image and the second medical image based on a change of a brightness of voxels of the first medical image and the second medical image; and correcting the coordinate system of the first medical image or the second medical image based on a similarity between directions in which the brightness of the voxels increases and decreases in the boundary regions selected in the first medical image and the second medical image.

The landmark points may include first landmark points extracted from a first anatomical object among the adjacent anatomical objects and second landmark points extracted from a second anatomical object among the adjacent anatomical objects; and the geometrical correlation among the adjacent anatomical objects may include any one or any combination of a shape, an area, a volume, lengths of sides, and angles between sides of a polygon or a polyhedron formed by the first landmark points extracted from the first object and the second landmark points extracted from the second object.

The organ of interest may be a liver, a kidney, or a gall bladder; and the adjacent anatomical objects may include at least two anatomical objects selected from the diaphragm, the inferior vena cava (IVC), the gall bladder, the liver, the hepatic portal vein, and the hepatic vein.

The first medical image may be a 3-dimensional (3D) magnetic resonance image (MRI), a computed tomography (CT) image, an X-ray image, or a positron emission tomography (PET) image showing the organ of interest and a lesion of the organ of interest; and the second medical image may be a 3D ultrasound image having an edge contrast lower than an edge contrast of the first medical image.

In another general aspect, a non-transitory computer-readable storage medium stores a computer program for controlling a computer to perform the method described above.

In another general aspect, an image registration apparatus for matching a plurality of medical images includes a first medical image storage unit configured to store a first medical image generated before a medical surgery; a second medical image obtaining unit configured to obtain a second medical image in real time during the medical surgery; a landmark point extracting unit configured to extract landmark points of at least two adjacent anatomical objects recognizable in the second medical image among a plurality of anatomical objects near an organ of interest of a patient from the first medical image and the second medical image; and a registration unit configured to register the first medical image and the second medical image based on a geometrical correlation among the adjacent anatomical objects indicated by the landmark points of the first medical image and a geometrical correlation among the adjacent anatomical objects indicated by the landmark points of the second medical image.

The landmark point extracting unit may be further configured to extract a part of the landmark points of the first medical image and the second medical image from a first anatomical object among the adjacent anatomical objects, and extract a remaining part of the landmark points of the first medical image and the second medical image from a second anatomical object among the adjacent anatomical objects.

The landmark point extracting unit may be further configured to extract a part of the landmark points of the first medical image and the second medical image from a centerline of a blood vessel near the organ of interest, and extract a remaining part of the landmark points of the first medical image and the second medical image from points on a boundary surface of the organ of interest that are closest to the landmark points extracted from the centerline of the blood vessel.

The registration unit may include a vector calculating unit configured to calculate a first vector indicating the geometrical correlation among the adjacent anatomical objects using coordinates of the landmark points of the first medical image, and calculate a second vector indicating the geometrical correlation among the adjacent anatomical objects using coordinates of the landmark points of the second medical image; and a basic registration unit configured to match a coordinate system of the first medical image and a coordinate system of the second medical image based on a difference between the first vector and the second vector.

The registration unit may further include a matrix calculating unit configured to calculate a transformation matrix for transforming the first vector or the second vector so that the difference between the first vector and the second vector is less than or equal to a predetermined threshold value; and the basic registration unit may be further configured to match the coordinate system of the first medical image and the coordinate system of the second medical image based on the transformation matrix, and perform at least one of scaling, moving and rotating the first medical image or the second medical image based on matched coordinates of the first medical image and the second medical image.

The registration unit may further include a boundary region selecting unit configured to select boundary regions indicating silhouettes of the adjacent anatomical objects in the first medical image and the second medical image based on a change of a brightness of voxels of the first medical image and the second medical image; and a registered image correcting unit configured to correct the coordinate system of the first medical image or the second medical image based on a similarity between directions in which the brightness of the voxels increases and decreases in the boundary regions selected in the first medical image and the second medical image.

The landmark points may include first landmark points extracted from a first anatomical object among the adjacent anatomical objects and second landmark points extracted from a second anatomical object among the adjacent anatomical objects; and the geometrical correlation among the adjacent anatomical objects may include any one or any combination of a shape, an area, a volume, lengths of sides, and angles between sides of a polygon or a polyhedron formed by the first landmark points extracted from the first object and the second landmark points extracted from the second object.

The organ of interest may be a liver, a kidney, or a gall bladder, and the adjacent anatomical objects may include at least two anatomical objects selected from the diaphragm, the inferior vena cava (IVC), the gall bladder, the liver, the hepatic portal vein, and the hepatic vein.

The first medical image may be a 3-dimensional (3D) magnetic resonance image (MRI), a computed tomography (CT) image, an X-ray image, or a positron emission tomography (PET) image showing the organ of interest and a lesion of the organ of interest; and the second medical image may be a 3D ultrasound image having an edge contrast lower than an edge contrast of the first medical image.

The second medical image may not show either one or both of the organ of interest and the lesion of the organ of interest.

In another general aspect, a method of medical image registration includes obtaining a first medical image in which anatomical objects near an organ of interest of a patient are recognizable; obtaining a second medical image in which the anatomical objects near the organ of interest are recognizable; extracting landmark points of the anatomical objects from the first medical image and the second medical image; and registering the first medical image and the second medical image based on the landmark points.

The first medical image may be obtained before a medical surgery to be performed on the patient; and the second medical image may be obtained in real time while the medical surgery is being performed on the patient.

The organ of interest may be recognizable in the first medical image; and the organ of interest may not be recognizable in the second medical image.

The extracting of the landmark points may include extracting the landmark points from the first medical image; and extracting the landmark points from the second medical image based on the landmark points extracted from the first medical image.

The registering of the first medical image and the second medical image may include registering the first medical image and the second medical image based on a geometrical correlation among the anatomical objects indicated by the landmark points of the first medical image and a geometrical correlation among the anatomical objects indicated by the landmark points of the second medical image.

Other features and aspects will be apparent from the following detailed description, the drawings, and the claims.

DETAILED DESCRIPTION

Figure 1:
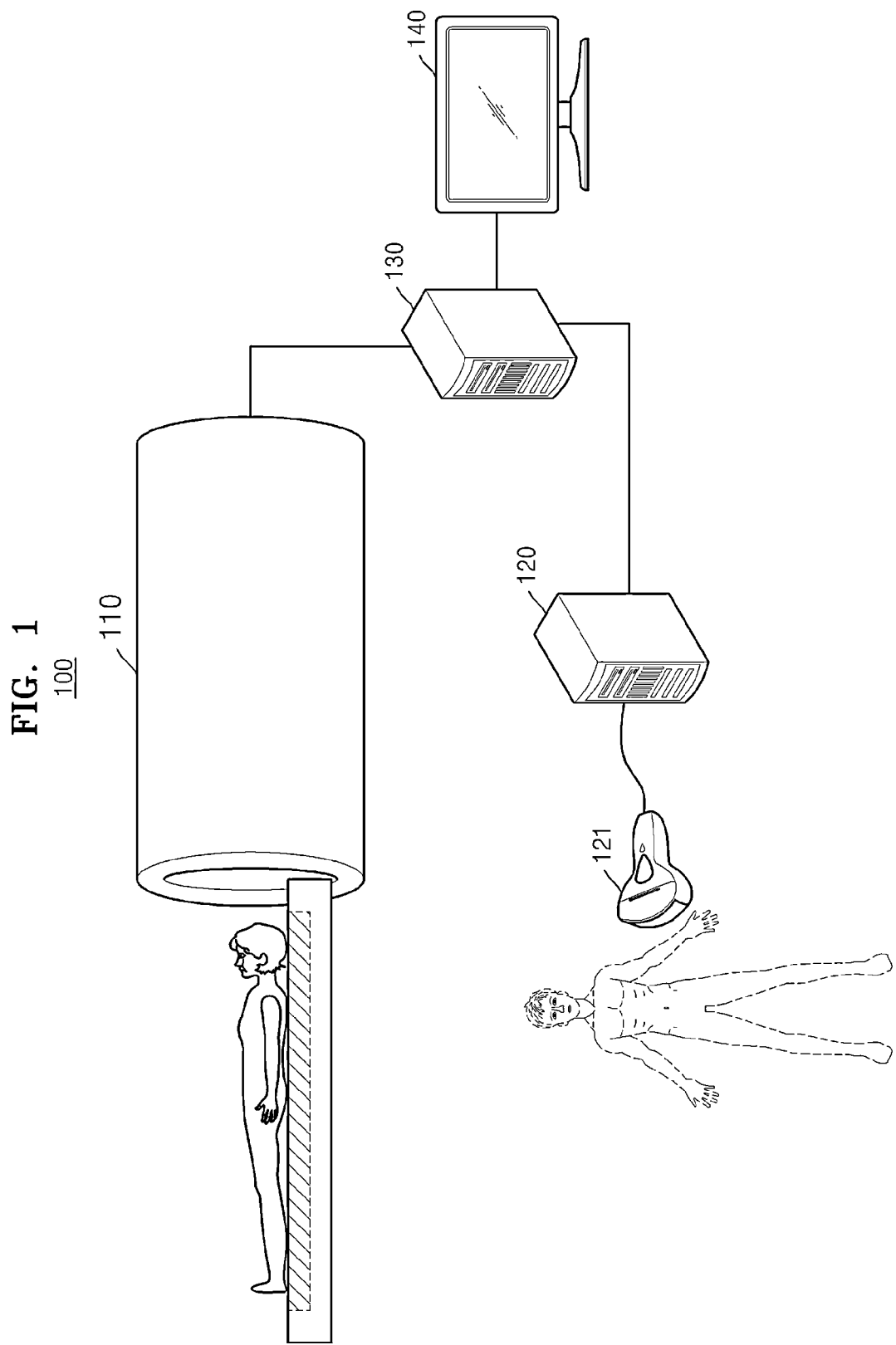
FIG. 1 is a diagram showing an example of a configuration of a medical image registration system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 is a diagram showing an example of a configuration of a medical image registration system 100. Referring to FIG. 1, the medical image registration system 100 includes a first medical imaging device 110, a second medical imaging device 120, an image registration device 130, and an image displaying device 140.

The first medical imaging device 110 photographs an organ of interest of a target body before a medical surgery and generates a first medical image. The first medical imaging device 110 generates the first medical image including anatomical information regarding organs and lesions located in a region of interest of the target body. For example, the first medical imaging device 110 may be a computed tomography (CT) imaging device, a magnetic resonance imaging (MRI) device, an X-ray imaging device, or a positron emission tomography (PET) imaging device. Hereinafter, for convenience of explanation, it will be assumed that the first medical image is a CT image or an MR image. In a CT image or an MR image generated by the first medical imaging device 110, locations of organs and lesions may be clearly recognized. However, shapes or locations of organs of a patient may change when the patient breathes or moves during a surgery, and it is not possible to reflect such real-time changes in a CT image or an MR image. The reason that it is not possible to display CT images in real time is that since an CT image is obtained using radiation, a patient and a surgeon may be exposed to radiation for a long time, and thus it is recommended to perform CT imaging for only a short period of time. The reason that it is not possible to display MR images in real time is that it takes a long time to take an MR image.

The second medical imaging device 120 provides a second medical image regarding a region of interest of a target body in real time. For example, the second medical imaging device 120 may be an ultrasonography machine for generating real-time images during an interventional medical surgery on a patient. The second medical imaging device 120 irradiates ultrasound signals to a region of interest using an attached probe 121, and generates an ultrasound image by detecting reflected ultrasound signals. The probe 121 is generally formed of piezoelectric transducers. When ultrasound waves of from several to several hundred MHz are transmitted from the probe 121 to a particular location in the body of a patient, the ultrasound waves are partially reflected by interlayers between different tissues. Particularly, ultrasound waves are reflected by portions inside the body where densities change, e.g., blood cells in blood plasma, small structures inside organs, etc. The reflected ultrasound waves oscillate piezoelectric transducers in the probe 121, and the piezoelectric transducers output electrical pulses based on the oscillations. The electrical pulses are converted to images.

The second medical image that may be obtained via the second medical imaging device 120, e.g., an ultrasound image, may be a real-time image. However, the second medical image contains a lot of noise, and thus it is difficult to recognize shapes, internal structures, or lesions of organs. The reason for this is that since a lesion and tissues surrounding the lesion have similar ultrasonic characteristics, contrasts at boundaries between the lesion and the tissues surrounding the lesion, that is, edge contrasts of objects, are relatively low in ultrasound images. Furthermore, there are noise and artifacts due to interference and diffusion of ultrasound waves. In other words, although the second medical image may be obtained quicker than the first medical image, a signal-to-noise ratio (SNR) and edge contrasts of objects of the second medical image are lower than those of the first medical image. Therefore, organs and lesions that may be recognized in the first medical image are not clearly recognizable in the second medical image.

The first medical imaging device 110 and the second medical imaging device 120 may generate not only 2-dimensional (2D) medical images, but also 3-dimensional (3D) medical images. For example, the first medical imaging device 110 and the second medical imaging device 120 may generate 3D medical images by accumulating 2D medical images as cross-sectional images of a 3D volume. For example, the second medical imaging device 120 may output 3D images as described below. The second medical imaging device 120 acquires a plurality of cross-sectional images regarding a particular portion of the body of a patient by changing a location and an orientation of the probe 121. Next, the second medical imaging device 120 accumulates the cross-sectional images and generates image data of a 3D volume which 3-dimensionally represents the particular portion of the body of the patient. The method of generating image data of a 3D volume by accumulating cross-sectional images as described above is referred to as a multiplanar reconstruction (MPR) method.

The image registration device 130 registers a first medical image acquired by the first medical imaging device 110 and a second medical image acquired by the second medical imaging device 120. As one example, an operation for registering a first medical image and a second medical image refers to an operation for mapping a first coordinate system of the first medical image to a second coordinate system of the second medical image. A result thereof may be a single medical image generated by synthesizing the first and second medical images, or an image in which the first medical image and the second medical image having a synchronized coordinate system are arranged next to each other. The image registration device 130 registers a first medical image and a second medical image according to geometrical correlations between anatomical objects shown in the first medical image and anatomical objects shown in the second medical image. The geometrical correlation refers to a relationship among landmark points extracted from anatomical objects. For example, first landmark points extracted from a first anatomical object and second landmark points extracted from a second anatomical object may form a polygon in a cross section of a 3D image, or form a polyhedron in a 3D image. Area, lengths of sides, angles between sides, and a shape of a polygon in a cross section of a 3D image constitute geometric correlations between the first anatomical object and the second anatomical object. Similarly, shape, outer surface area, volume, lengths of sides, and angles between sides of a polyhedron constitute geometric correlations between the first anatomical object and the second anatomical object. Hereinafter, for convenience of explanation, distances between landmark points of the first anatomical object and landmark points of the second anatomical object, that is, lengths of sides of a polygon in a cross section of a 3D image will be used as geometrical correlations between the first anatomical object and the second anatomical object.

A registered medical image generated by the image registration device 130 is displayed via the image displaying device 140.

Meanwhile, not all anatomical objects shown in a first medical image may be recognized in a second medical image. For example, in an ultrasound image regarding the liver region, it is impossible to recognize the shape of the liver due to low edge contrasts of anatomical information regarding the shape of the liver and noise mixed therewith. However, since blood vessels of the liver are shown darker than the background in an ultrasound image, the vascular structure of the liver may be determined based on shadows in an ultrasound image. Therefore, in an ultrasound image, the location of the liver may be estimated based on the vascular structure of the liver. Furthermore, an ultrasound image may be registered with an MR image or a CT image by comparing the vascular structure of the liver extracted from the ultrasound image to the vascular structure of the liver extracted from the MR image or the CT image. However, it is difficult to recognize the vascular structure of a liver cancer patient or a cirrhosis patient in a ultrasound image due to reasons including necrosis of liver tissues. As a result, it is difficult to register an ultrasound image of a liver cancer patient or a cirrhosis patient and an MR image or a CT image of the patient.

The image registration device 130 may resolve the problem by registering a second medical image in which no anatomical structure regarding organs or vascular structures of organs is shown and a first medical image. Instead of using anatomical structures regarding organs and lesions of a region of interest that are not recognizable in a second medical image due to noise, the image registration device 130 performs registration using anatomical objects that are outside organs and are adjacent to the organs. For example, although the shape of the liver and information regarding a lesion may not be recognized in an ultrasound medical image of a liver cancer patient, a diaphragm near the boundary surface of the liver and an inferior vena cava (IVC) adjacent to the liver may be clearly recognizable in the ultrasound image of the liver cancer patient. The image registration device 130 registers a first medical image and a second medical image using information regarding the diaphragm and the IVC that are clearly shown in both the first medical image and the second medical image. Therefore, even if all information regarding the liver, which is the organ of interest, is lost in the second medical image, the first medical image and the second medical image regarding the liver may be registered using information regarding the IVC and the diaphragm.

Figure 2:
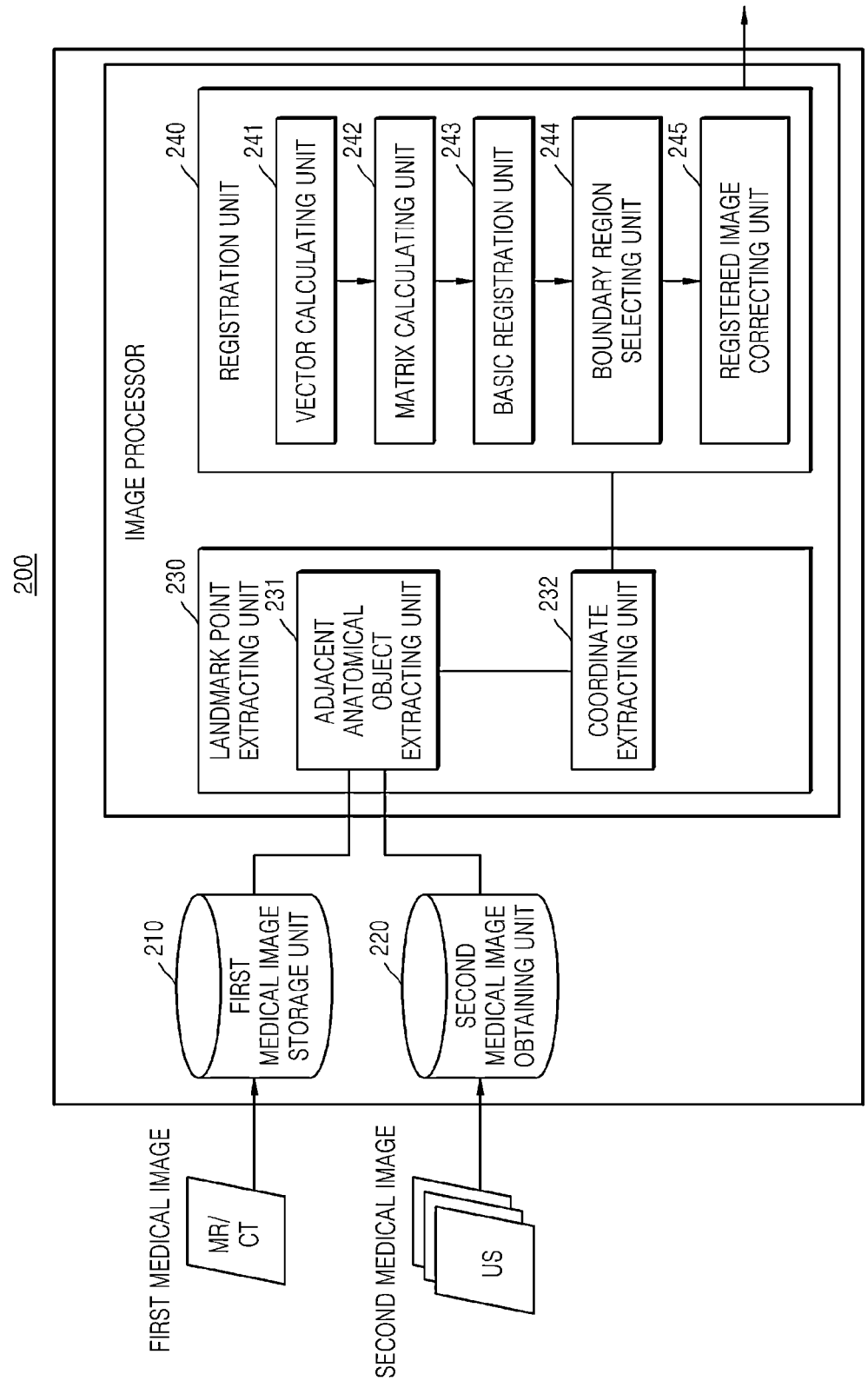
FIG. 2 is a diagram showing an example of an image registration device.

FIG. 2 is a diagram showing an example of an image registration device 200. Referring to FIG. 2, the image registration device 200 includes a first medical image storage unit 210, a second medical image obtaining unit 220, a landmark point extracting unit 230, a vector calculating unit 241, and a registration unit 240.

The first medical image storage unit 210 stores a first medical image output by the first medical imaging device 110. The first medical imaging device 110 may generate the first medical image regarding a region of interest of a target body in advance before a medical surgery. Therefore, the image registration device 200 registers the first medical image, which is generated and stored in the first medical image storage unit 210 before a medical surgery, and a second medical image obtained in real time during the medical surgery. As described above, the first medical image may be a 3D MR image or a CT image.

The second medical image obtaining unit 220 obtains second medical images output by the second medical imaging device 120 in real time. Since the second medical imaging device 120 generates second medical images regarding a region of interest of a target body in real time during a medical surgery, the second medical image obtaining unit 220 may obtain a second medical image simultaneously as the second medical imaging device 120 generates the second medical image.

Therefore, the second medical image obtained by the second medical image obtaining unit 220 may reflect movement of anatomical objects caused by body activities of a patient in real time. As described above, the second medical image may be a 3D ultrasound image.

The landmark point extracting unit 230 extracts landmark points regarding at least two adjacent anatomical objects among a plurality of anatomical objects near an organ of interest, where the at least two adjacent anatomical objects may be recognized in a second medical image with relatively low edge contrasts. Instead of extracting landmark points from an organ or the internal vascular structure of the organ, the landmark point extracting unit 230 extracts landmark points from the adjacent anatomical objects that are outside the organ of interest and are near the organ of interest. The term landmark point refers to a reference point for registering images. A landmark point may be determined as described below.

Operation A. A point clearly reflecting anatomical characteristics of a target object is determined as a landmark point. For example, if an organ for extracting landmark points is the liver, a blood vessel splitting point in the vascular structure of the liver may be extracted as a landmark point. If an organ for extracting landmark points is the heart, the boundary between the left atrium and the right atrium and the boundary between the vena cava and the outer wall of the heart may be extracted as landmark points.

Operation B. The highest point or the lowest point of a target object for extracting landmark points in a set coordinate system may also be extracted as a landmark point.

Operation C. Points for interpolating between the landmark points selected in the operations A and B described above may be selected at a predetermined interval along the target object and set as landmark points.

The set landmark points may be represented as 2D coordinates on the x axis and the y axis, or represented as 3D coordinates on the x-axis, the y-axis, and the z-axis. Therefore, if 3D coordinates of landmark points are represented as a vector $x_0, x_1, \ldots x_{n-1}$ (where n denotes a number of landmark points), the coordinates may be represented as shown in Equation 1 below.

$$\begin{aligned} x_{i0} &= [x_{i0}, y_{i0}, z_{i0}] \\ x_{i1} &= [x_{i1}, y_{i1}, z_{i1}] \\ &\vdots \\ x_{in-1} &= [x_{in-1}, y_{in-1}, z_{in-1}] \end{aligned} \quad (1)$$

The subscript i denotes landmark point coordinate information in an i-th second medical image.

The landmark point extracting unit 230 includes an adjacent anatomical object extracting unit 231 and a coordinate extracting unit 232. The adjacent anatomical object extracting unit 231 extracts anatomical objects that are outside an organ of interest and near the organ of interest from a first medical image or a second medical image. The coordinate extracting unit 232 performs the landmark point selecting operations A, B, and C described above and extracts coordinates of landmark points.

The adjacent anatomical object extracting unit 231 extracts anatomical objects that are near an organ of interest in a first medical image or a second medical image and are clearly recognized in both the first medical image and the second medical image. The adjacent anatomical object extracting unit 231 may extract at least two anatomical objects as adjacent anatomical objects. It is necessary for the adjacent anatomical object extracting unit 231 to be able to extract anatomical objects that are outside an organ of interest and near the organ of interest even if all anatomical information regarding the organ of interest is lost in a second medical image. Therefore, information regarding adjacent anatomical objects to be extracted may be input to the adjacent anatomical object extracting unit 231 in advance. For example, in the case of the liver region, anatomical objects that are outside the liver and near the liver include the diaphragm, the IVC, the gall bladder, the hepatic portal vein, and the hepatic vein. In this case, information for recognizing the diaphragm, the IVC, the gall bladder, the hepatic portal vein, and the hepatic vein in a second medical image may be input to the adjacent anatomical object extracting unit 231 in advance. For example, anatomical information indicating that the diaphragm is a flat surface having a curvature less than or equal to a predetermined value and that the IVC is a blood vessel having a diameter less than or equal to 10 mm may be input to the adjacent anatomical object extracting unit 231 in advance.

Figure 3:
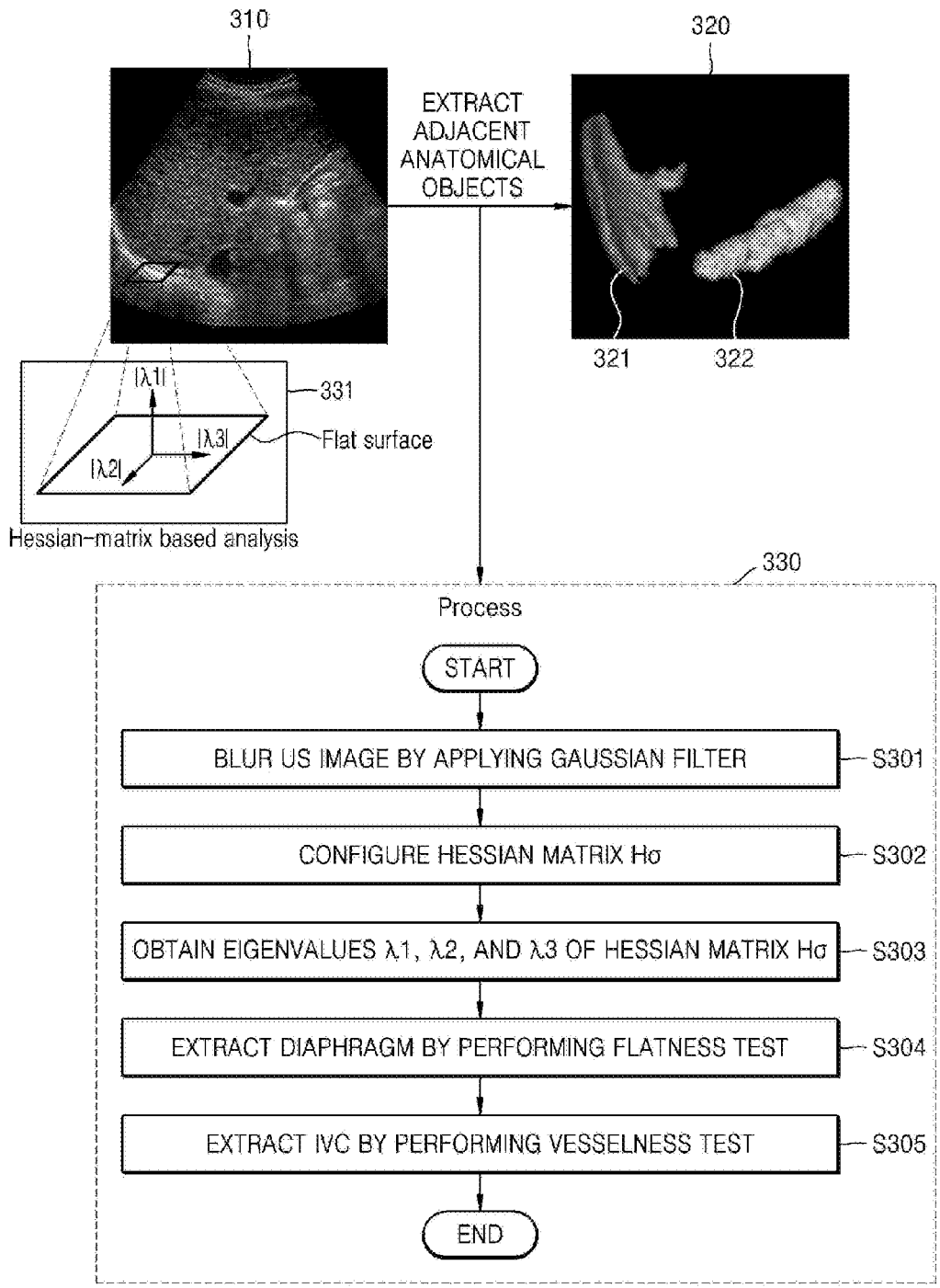
FIG. 3 is a diagram showing an example of a process in which the image registration device of FIG. 2 extracts anatomical objects near an organ.

FIG. 3 is a diagram showing an example of a process in which the image registration device of FIG. 2 extracts anatomical objects near an organ. Referring to FIG. 3, a process in which the adjacent anatomical object extracting unit 231 extracts the diaphragm and the IVC as anatomical objects near the liver from a medical image of the liver region will be described. A second medical image 310 shown in FIG. 3 is a 2D cross-sectional image of a 3D ultrasound image taken of the liver region of a liver cancer patient, where extracted adjacent anatomical objects 320 include the diaphragm 321 and the IVC 322. Meanwhile, as shown in the second medical image 310, anatomical information regarding the liver and the cancer cells are not recognizable in the ultrasound image. In an adjacent anatomical object extracting operation 330, a Hessian matrix-based filtering is performed to extract the adjacent anatomical objects. However, the Hessian matrix-based filtering is merely an example, and methods for extracting adjacent anatomical objects are not limited thereto. A Hessian matrix is also referred to as a total differential matrix, where a region of an image corresponding to an abrupt voxel value change may be determined using a second-order differential function regarding voxel values. The region corresponding to an abrupt voxel value change is interpreted as the boundary between an object and another object, or the boundary between an object and the background.

Referring to FIG. 3, a blurring operation is performed to remove noise from an ultrasound (US) image by applying a Gaussian filter (operation S301) to the ultrasound image to blur the ultrasound image. A Hessian matrix is configured with respect to the blurred ultrasound image (operation S302). The Hessian matrix regarding image values of blurred voxels may be configured as shown in Equation 2 below.

$$H\sigma(x, y, z) = \begin{bmatrix} \frac{\partial^2 I_\sigma}{\partial x \partial x} & \frac{\partial^2 I_\sigma}{\partial x \partial y} & \frac{\partial^2 I_\sigma}{\partial x \partial z} \\ \frac{\partial^2 I_\sigma}{\partial y \partial x} & \frac{\partial^2 I_\sigma}{\partial y \partial y} & \frac{\partial^2 I_\sigma}{\partial y \partial z} \\ \frac{\partial^2 I_\sigma}{\partial z \partial x} & \frac{\partial^2 I_\sigma}{\partial z \partial y} & \frac{\partial^2 I_\sigma}{\partial z \partial z} \end{bmatrix} \quad (2)$$

In Equation 2, Hσ(x,y,z) denotes a Hessian matrix regarding a voxel (x,y,z), whereas the element Iσ denotes an image value of a voxel (x,y,z) that is blurred by applying the Gaussian filter thereto. Next, the Hessian matrix Hσ is eigendecomposed to obtain eigenvalues λ1, λ2, and λ3 (operation S303). The eigenvalues λ1, λ2, and λ3 are included in the conceptual diagram 331 of Hessian matrix analysis. A flatness test is performed using the eigenvalues λ1, λ2, and λ3 to remove non-diaphragm regions (operation S304). The flatness test refers to an algorithm for detecting a flat surface. The flat surface is defined by the eigenvalues λ2 and λ3 if the eigenvalue λ1 is greater than the eigenvalues λ2 and λ3 by a predetermined threshold value. A voxel (x,y,z) in the flat surface is determined as a voxel of the diaphragm. Voxels of the diaphragm region may be extracted via the flatness test.

The adjacent anatomical object extracting unit 231 may extract the diaphragm and the IVC from an ultrasound image regarding the liver region. The IVC may be extracted in a manner similar to the extraction of the diaphragm using a Hessian matrix. If the adjacent anatomical object extracting unit 231 extracts the IVC, a vesselness test is performed using eigenvalues λ1, λ2, and λ3 of a Hessian matrix. The vesselness text refers to an algorithm for determining a voxel having a property of a straight line in a direction corresponding to the eigenvalue λ1 if the smallest eigenvalue λ1 is smaller than the other two eigenvalues λ2 and λ3 by a predetermined threshold value. Therefore, it may be determined whether a voxel (x,y,z) is a voxel belonging to the IVC by performing the vesselness test. Therefore, voxels of the IVC region may be extracted.

Next, referring back to FIG. 2, a process in which the coordinate extracting unit 232 extracts coordinates will be described. The coordinate extracting unit 232 extracts coordinates of landmark points on adjacent anatomical objects extracted by the adjacent anatomical object extracting unit 231. The adjacent anatomical objects extracted by the adjacent anatomical object extracting unit 231 are 3D volumes, where the coordinate extracting unit 232 may limit regions for extracting landmark points in advance and extract coordinates of the landmark points. For example, if the adjacent anatomical object extracting unit 231 extracts a tube-like IVC as an adjacent anatomical object, the coordinate extracting unit 232 may limit a landmark point extracting region so that coordinates of landmark points are to be extracted from the centerline of the IVC.

Figure 4:
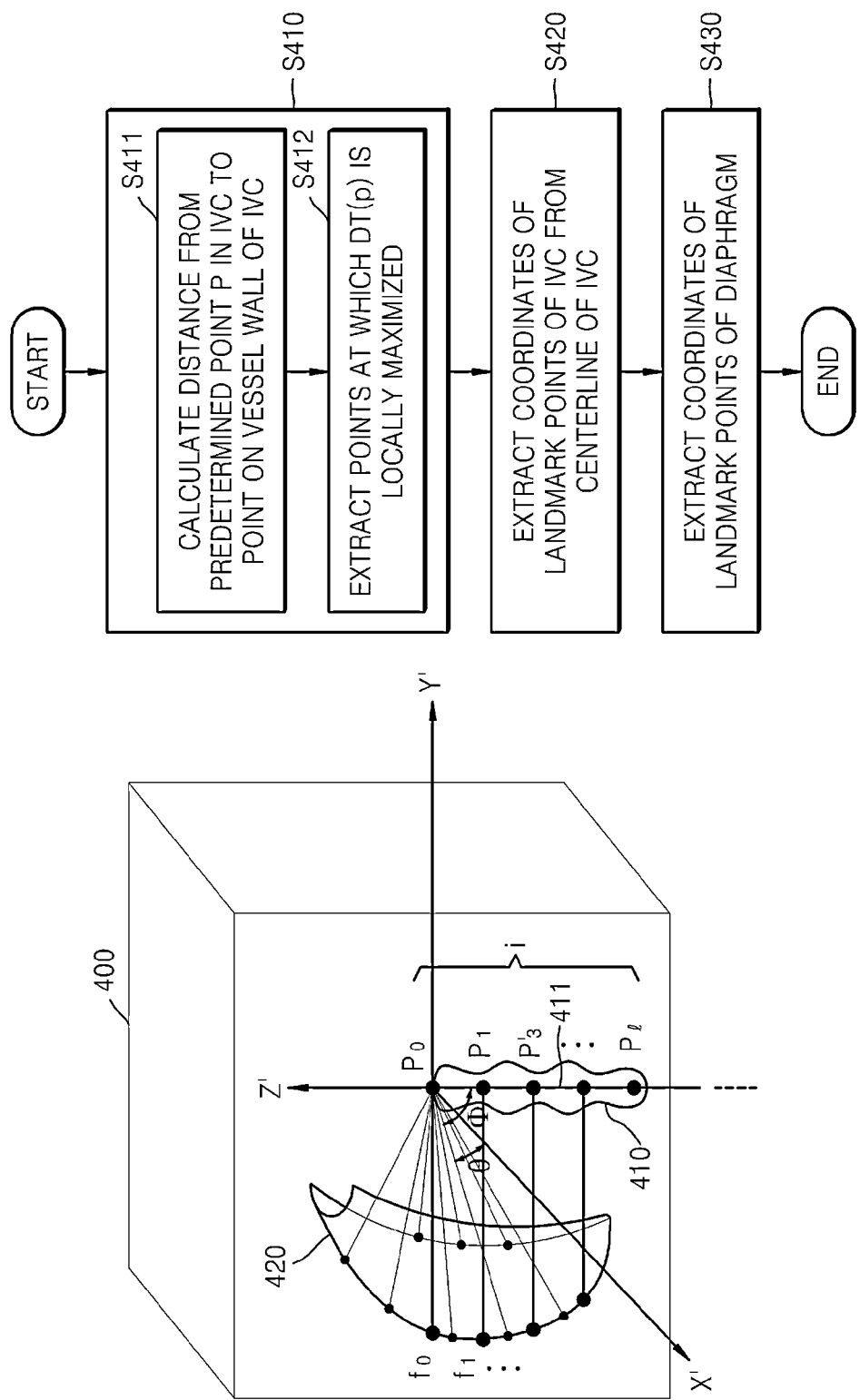
FIG. 4 is a diagram showing an example of a process in which the image registration device of FIG. 2 extracts coordinates of landmark points.

FIG. 4 is a diagram showing an example of a process in which the image registration device 200 of FIG. 2 extracts coordinates of landmark points. Referring to FIG. 4, a process in which the coordinate extracting unit 232 extracts coordinates of landmark points on adjacent anatomical objects will be described in detail.

Referring to FIG. 4, the coordinate extracting unit 232 extracts the centerline 411 from the IVC 410 (operation S410) in a 3D image 400. An algorithm for extracting the centerline 411 from the IVC 410 is described below.

First, a distance dist(p,q) between a predetermined point p in the IVC 410 and a point q on a vessel wall of the IVC closest to the predetermined point p is calculated (operation S411). The distance calculation is performed with respect to all points in the IVC 410. To calculate the distance dist(p,q), a distance transformation (DT) may be performed. The DT is a calculation for obtaining a distance between an arbitrary point to the boundary of the closest object in an image, and may be defined as shown in Equation 3 below. In Equation 3, S denotes a surface of a vessel wall.

$$DT(p) = \min_{q \in S} dist(p, q) \quad (3)$$

A point among a plurality of points in a fine volume ∂v of the IVC at which the DT(p) reaches the peak locally is a point located on the centerline of the IVC. Therefore, points at which DT(p) reaches the peak locally are extracted (operation S412). The extracted points constitute the centerline of the IVC as shown in Equation 4 below.

$$CL = \left\{ p \mid \max_{p \in \partial V} DT(p) \right\} \quad (4)$$

To select a fine volume ∂V in the operation S412, a point p0 at which the DT(p) reaches the peak is found in the entire volume of an adjacent anatomical object. Next, a sphere having the point p0 as the center and having a radius dist(p0,q0) to contact the IVC is selected as a fine volume ∂V0. Next, among points in the fine volume ∂V0 other than the point p0, a point p1 having the greatest DT(p) is found. Next, a sphere having the point p1 as the center and having a radius dist(p1,q1) to contact the IVC is selected as a fine volume ∂V1. Points pi located on the centerline of the IVC may be extracted by repeating the operation described above.

The coordinate extracting unit 232 extracts coordinates of landmark points on the extracted centerline of the IVC (operation S420). The coordinate extracting unit 232 may extract coordinates of the landmark points on the centerline of the IVC via the operations A, B, and C described above. Alternatively, the coordinate extracting unit 232 may select all points pi constituting the centerline and extract coordinates thereof.

Next, the coordinate extracting unit 232 extracts coordinates of landmark points of the diaphragm 420 (operation S430). To extract coordinates of landmark points on the diaphragm 420, the coordinate extracting unit 232 may use the landmark points pi of the IVC described above. In other words, among a plurality of points on the diaphragm 420, points located at a predetermined distance or in a predetermined direction from the landmark points pi of the IVC may be selected as landmark points of the diaphragm 420. For example, a method of extracting coordinates of landmark points on the diaphragm 420 based on the landmark point p0 on the IVC will be described. For convenience of explanation, a local coordinate system in which the centerline of the IVC is in the Z'-axis direction will be used. Furthermore, an angle between a straight line extending from the landmark point p0 on the IVC and the X'-axis will be referred to as an angle θ, and an angle between the straight line and the Z'-axis will be referred to as an angle φ. The coordinate extracting unit 232 changes a coordinate (θ,φ) according to a preset value, and may select coordinates of points at which the straight line extending from the landmark point p0 reaches the diaphragm 420 as landmark points. For example, the angle θ may be fixed to an initial angle θ0 input in advance and the angle φ is changed within a range from 0 degrees to 180 degrees by a predetermined interval. Next, the angle θ0 is changed to preset angles θ1, θ2, and so on and the operation as described above is repeated. As a result, n straight lines respectively corresponding to angles θ0 through θn are formed on the diaphragm 420, and coordinates of landmark points on the n straight lines may be extracted.

Alternatively, the coordinate extracting unit 232 may extract landmark points on the diaphragm 420 by selecting a point f0 on the diaphragm 420 corresponding to the shortest straight line extending from the point p0 among a plurality of points on the straight line as a landmark point of the diaphragm 420, and extracting coordinates of the point f0. In this regard, points fi on the diaphragm 420 corresponding to the points pi may be selected as landmark points, and coordinates thereof may be extracted. The above examples are for describing extraction of landmark points of the diaphragm 420 by the coordinate extracting unit 232 in consideration of landmark points of the IVC 410. However, the examples are not limited thereto.

Furthermore, although adjacent anatomical objects are extracted from a second medical image and landmark points are extracted from the adjacent anatomical objects in the examples described above, one of ordinary skill in the art will understand that adjacent anatomical objects may be extracted from a first medical image and landmark points may be extracted from the adjacent anatomical objects in the same regard. Furthermore, the landmark point extracting unit 230 may select landmark points regarding a second medical image, whereas landmark points may be selected in a first medical image according to inputs of a user. Particularly, if a first medical image is an MR image or a CT image, information regarding the diaphragm and the IVC is clearly provided to a user, and thus landmark points of the diaphragm and the IVC may be accurately selected according to inputs of the user.

Referring back to FIG. 2, the registration unit 240 registers a first medical image and a second medical image based on a geometrical correlation between adjacent anatomical objects indicated by landmark points of the first medical image and a geometrical correlation between adjacent anatomical objects indicated by landmark points of the second medical image. In other words, the registration unit 240 compares geometrical correlations between adjacent anatomical objects in the first medical image and the second medical image and registers the first medical image and the second medical image based on a result of the comparison. It is assumed that the geometrical correlations between adjacent anatomical objects are distances between landmark points of a first object and a second object.

The registration unit 240 includes the vector calculating unit 241, a matrix calculating unit 242, a basic registration unit 243, a boundary region selecting unit 244, and a registered image correcting unit 245. The vector calculating unit 241, the matrix calculating unit 242, and the basic registration unit 243 quickly perform initial registration of a first medical image and a second medical image based on landmark points. Next, the boundary region selecting unit 244 and the registered image correcting unit 245 correct the registered image more precisely based on brightness of voxels of the first medical image and the second medical image. The registration based on landmark points and the registration based on brightness of voxels will be compared briefly. The registration based on landmark points is a method for registering medical images by comparing landmark points the medical images have in common. Since the registration based on landmark points uses information regarding extracted landmark points, the registration based on landmark points performs a relatively small amount of calculations and is capable of registering medical images quickly. On the contrary, although the registration based on brightness of voxels does not perform extraction of landmark points, calculations are performed with respect to all voxels to measure similarities between medical images. Therefore, the registration based on brightness of voxels performs a large amount of calculations and it takes long time to complete registration. However, in a case where initial registration based on landmark points is performed in advance, the amount of calculations for performing the registration based on brightness of voxels may be reduced, and thus registration may be performed quickly. Therefore, the registration unit 240 may perform initial registration based on landmark points and correct a result of the initial registration based on brightness of voxels.

The vector calculating unit 241 calculates vectors indicating relative geometrical correlations among adjacent anatomical objects extracted from a first medical image and a second medical image using coordinates of landmark points selected by the landmark point extracting unit 230. For example, the vector calculating unit 241 matches coordinates of landmark points of the IVC to coordinates of landmark points of the diaphragm in a first medical image. Furthermore, the vector calculating unit 241 matches coordinates of landmark points of the IVC to coordinates of landmark points of the diaphragm in a second medical image. Hereinafter, an example in which the vector calculating unit 241 calculates vectors will be described in detail. Before describing the example, a particular method by which the coordinate extracting unit 232 extracts coordinates of landmark points on the diaphragm 420 as described above will be specified, and then the operation of the vector calculating unit 241 will be described.

Figure 5:
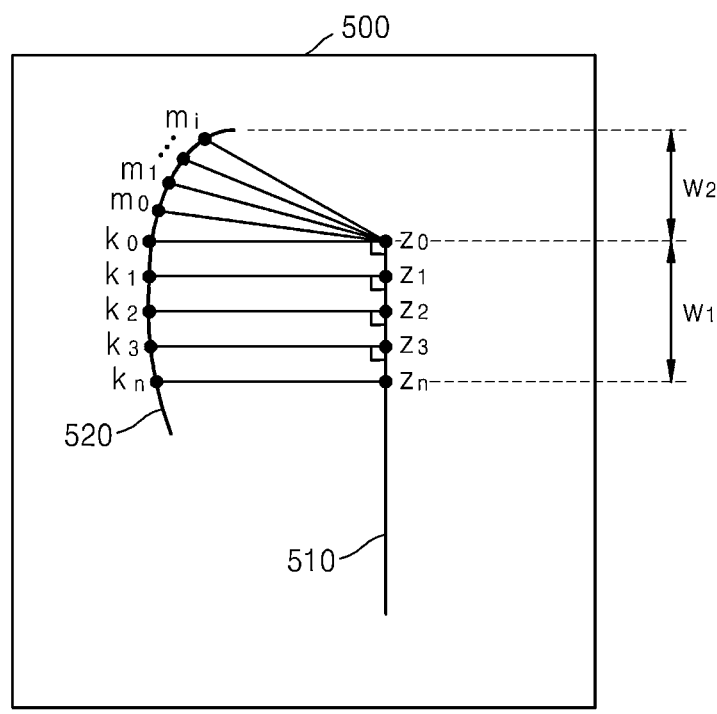
FIG. 5 is a diagram showing an example of a process in which the image registration device of FIG. 2 calculates a vector using the coordinates of the landmark points of the anatomical objects near the organ.

FIG. 5 is a diagram showing an example of a process in which the image registration device 200 of FIG. 2 calculates a vector using the coordinates of the landmark points of the anatomical objects near the organ. Referring to FIG. 5, a medical image cross section 500 briefly shows a cross section of a 3D first medical image or a 3D second medical image. In the medical image cross section 500, for convenience of explanation, organs and anatomical objects other than the IVC 510 and the diaphragm 520 are omitted. The medical image cross section 500 corresponds to a surface having a predetermined 0 value with respect to the 3D image 400 of FIG. 4. Therefore, if the 0 value is changed, surfaces similar to the medical image cross section 500 may appear. First, in a first section W1 in which the diaphragm 520 and the IVC 510 are arranged next to each other, the coordinate extracting unit 232 extracts coordinates of landmark points at a point where distances from landmark points of the IVC 510 to the diaphragm 520 are minimized. Meanwhile, in a second section W2 in which the diaphragm 520 is located above the topmost landmark point z0 of the IVC 510 in the Z'-axis direction, coordinates of landmark points of the diaphragm 520 are extracted by changing the angle φ by a constant interval at the topmost landmark point z0 of the IVC 510.

In this case, regarding the first section W1, the vector calculating unit 241 matches landmark points z0 through zn of the IVC 510 to landmark points k0 through kn of the diaphragm 520, respectively. Next, the vector calculating unit 241 calculates distances d0 through dn between matched landmark points using coordinates of the matched landmark points.

Next, regarding the second section W2, the vector calculating unit 241 matches the topmost landmark point z0 of the IVC 510 and landmark points m0 through mi of the diaphragm 520 in the second section W2. Next, the vector calculating unit 241 calculates distances l0 through li from the topmost landmark point z0 of the IVC 510 to the landmark points m0 through mi of the diaphragm 520.

Accordingly, the vector calculating unit 241 calculates a vector V1 indicating a distance between the diaphragm 520 and the IVC 510 for an angle θ1 as shown in Equation 5 below.

$$V_1 = [l_0, l_1, \ldots, l_i, d_0, \ldots, d_n]^T \qquad (5)$$

The vector calculating unit 241 may calculate vectors V2 through Vn corresponding to angles θ2 through θn, respectively. Accordingly, the vector calculating unit 241 may calculate vectors from a first medical image and a second medical image.

Referring back to FIG. 2, the matrix calculating unit 242 calculates a transformation matrix T for matching a vector calculated from a first medical image and a vector calculated from a second medical image within a predetermined error range. For example, if the vector calculated from the first medical image is denoted by $Y_{MR}$ and the vector calculated from the second medical image is denoted by $X_{US}$ the error $\hat{T}$ may be indicated as shown in Equation 6 below.

$$\hat{T} = \underset{T}{\operatorname{argmin}} \, \|Y_{MR} - TX_{US}\| \qquad (6)$$

The matrix calculating unit 242 calculates a transformation matrix T for minimizing the error $\hat{T}$ according to Equation 6.

The basic registration unit 243 matches the coordinate system of a first medical image and the coordinate system of a second medical image based on a difference between the vector $Y_{MR}$ calculated from the first medical image and the vector $X_{US}$ calculated from the second medical image. More particularly, the basic registration unit 243 matches the coordinate system of the first medical image and the coordinate system of the second medical image based on the transformation matrix T. The basic registration unit 243 performs at least one of scaling, moving and rotating the first medical image or the second medical image based on matched coordinates of the first medical image and the second medical image.

Figure 6:
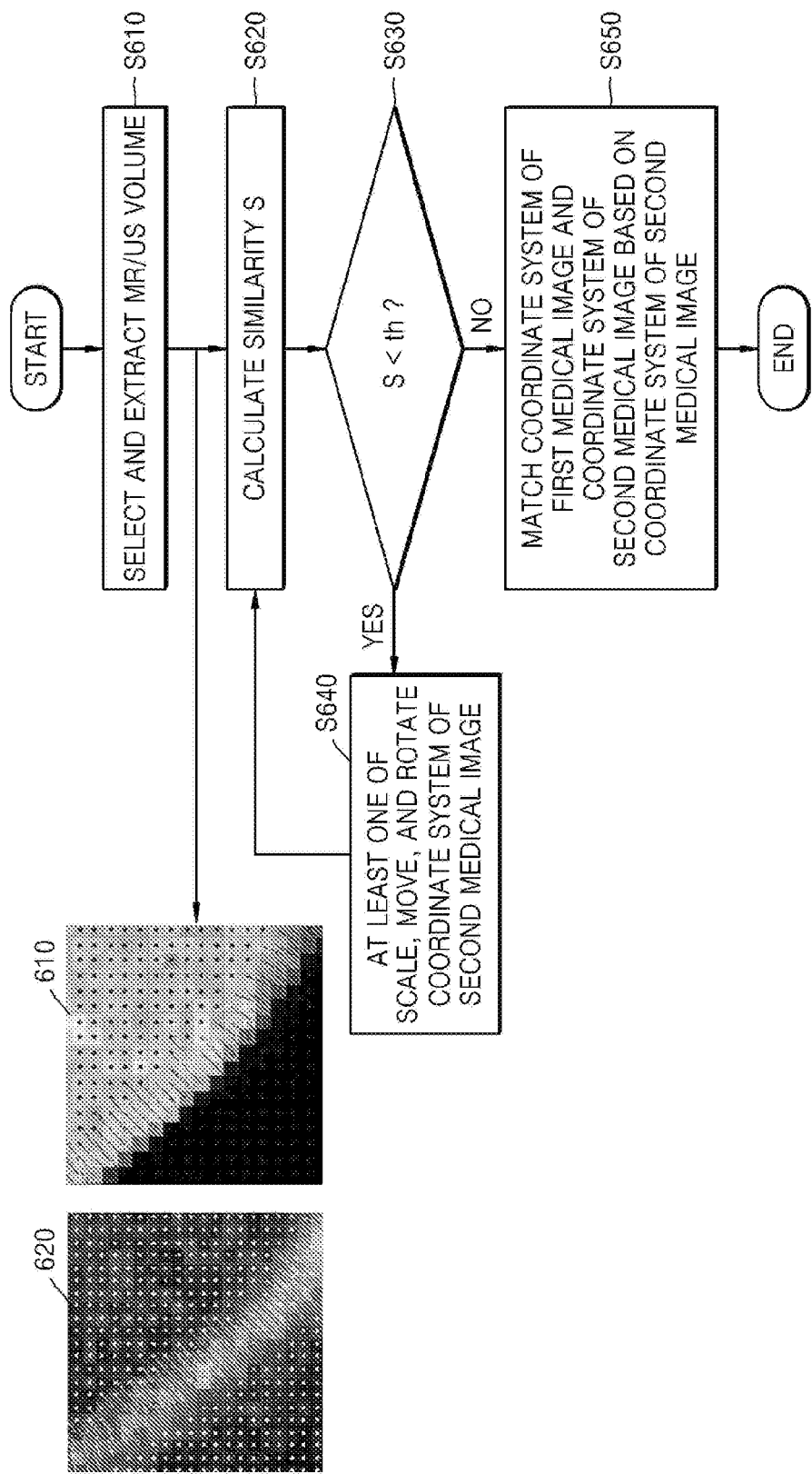
FIG. 6 is a diagram showing an example of a process in which the image registration device of FIG. 2 corrects registered medical images using the calculated vector.

FIG. 6 is a diagram showing an example of a process in which the image registration device 200 of FIG. 2 corrects registered medical images using the calculated vector. The boundary region selecting unit 244 selects boundary regions regarding silhouettes of adjacent anatomical objects in the first medical image and the second medical image by analyzing a pattern in which brightness of voxels increases and decreases, that is, the gradient. Referring to FIG. 6, the right image shows gradient information regarding a first medical image 610, whereas the left image shows gradient information regarding a second medical image 620. In other words, the boundary region selecting unit 244 selects an edge volume of the IVC and an edge volume of the diaphragm in each of a first medical image and a second medical image (operation S610). The boundary region selecting unit 244 may select a region in which a change of brightness of voxels exceeds a predetermined threshold value as a boundary region.

The registered image correcting unit 245 corrects the coordinate system of the first medical image 610 or the second medical image 620 based on a similarity of directions in which brightness increases and decreases in the boundary regions between the IVC and the diaphragm that are selected in each of the first medical image 610 and the second medical image 620. Referring to FIG. 6, the registered image correcting unit 245 evaluates a similarity S between the first medical image 610 and the second medical image 620 using directions in which brightness increases and decreases in boundary regions that are selected in each of the first medical image 610 and the second medical image 620. The similarity S may be calculated as shown in Equation 7 below.

$$S = \frac{\sum_{X_{2D} \in (R_{US} \cap R_{MR})} 1 + \cos(2\Delta\Psi_{X_{2D}})}{N_{US} + N_{MR}} \quad (7)$$

In Equation 7, $N_{US}$ and $N_{MR}$ denote the numbers of voxels in boundary regions in the first medical image 610 and the second medical image 620, respectively. The intersection of $R_{US}$ and $R_{MR}$ denotes a boundary region common to the first medical image 610 and the second medical image 620, $X_{2D}$ denotes an arbitrary point in the boundary region common to the first medical image 610 and the second medical image, and $\Delta\Psi$ denotes an angle indicating a difference between a direction in which brightness increases and decreases in the first medical image 610 and a direction in which brightness increases and decreases in the second medical image 620.

For example, if $\Delta\Psi=0°$, the similarity S is maximized. If $\Delta\Psi=90°$, the similarity S is minimized.

The registered image correcting unit 245 compares the similarity S to a predetermined threshold value th (operation S630). If the calculated similarity S is less than the threshold value th, the registered image correcting unit 245 performing at least one of scaling, moving and rotating the coordinate system of the second medical image 620 (operation S640). If the calculated similarity S is equal to or greater than the threshold value th, the registered image correcting unit 245 matches the coordinate system of the first medical image 610 and the coordinate system of the second medical image 620 based on the coordinate system of the second medical image 620 (operation S650).

The image registration device 200 described above may be embodied as a combination of a memory and an image processor. For example, the first medical image storage unit 210 and the second medical image obtaining unit 220 may be embodied as memories for storing a first medical image and a second medical image that are output by the first medical imaging device 110 and the second medical imaging device 120, respectively. Furthermore, the first medical image storage unit 210 and the second medical image obtaining unit 220 may be either embodied as separate memories or embodied as a single memory. Furthermore, the landmark point extracting unit 230 and the registration unit 240 may be embodied with a single image processor or multiple image processors. The image registration device 200 may further include an input/output (I/O) interface (not shown) for receiving predetermined information from a user. The predetermined information may include information regarding locations of landmark points of a first medical image in a case where a user manually inputs landmark points of the first medical image, for example.

Figure 7:
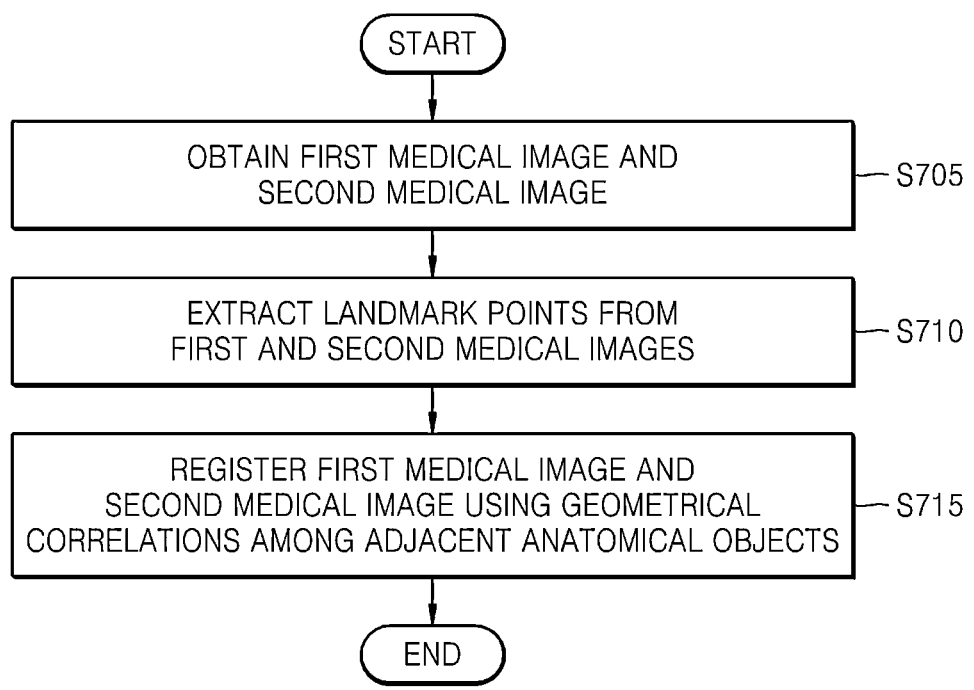
FIG. 7 is a flowchart showing an example of a method of medical image registration.

FIG. 7 is a flowchart showing an example of a method of medical image registration. Descriptions that have already been provided above with reference to FIGS. 1 through 6 will be omitted below. Therefore, even if not shown in FIG. 7, details of the method of medical image registration of FIG. 7 may be understood with reference to FIGS. 1 through 6.

Referring to FIG. 7, the image registration device 200 obtains a first medical image that is obtained before a medical surgery and a second medical image that is obtained in real time during the medical surgery (operation S705). The first medical image is an image in which an organ of interest of a patient and a lesion of the organ of interest are shown, whereas the second medical image is an image with relatively low edge contrast. The second medical image may not show the organ of interest of the patient or the lesion regarding the organ of interest.

The image registration device 200 extracts landmark points of at least two adjacent anatomical objects that may be recognized in the second medical image with low edge contrast among a plurality of anatomical objects near the organ of interest from the first medical image and the second medical image (operation S710).

The image registration device 200 registers the first medical image and the second medical image based on a geometrical correlation among the adjacent anatomical objects that is indicated by the landmark points of the first medical image and a geometrical correlation among the adjacent anatomical objects that is indicated by the landmark points of the second medical image (operation S715). In other words, the image registration device 200 calculates vectors indicating geometrical correlations among the adjacent anatomical objects from the first and second medical images. Next, the image registration device 200 registers the first medical image and the second medical image using the vectors calculated from the first and second medical images so that the geometrical correlations among the adjacent anatomical objects are registered in the first and second medical images.

Figure 8:
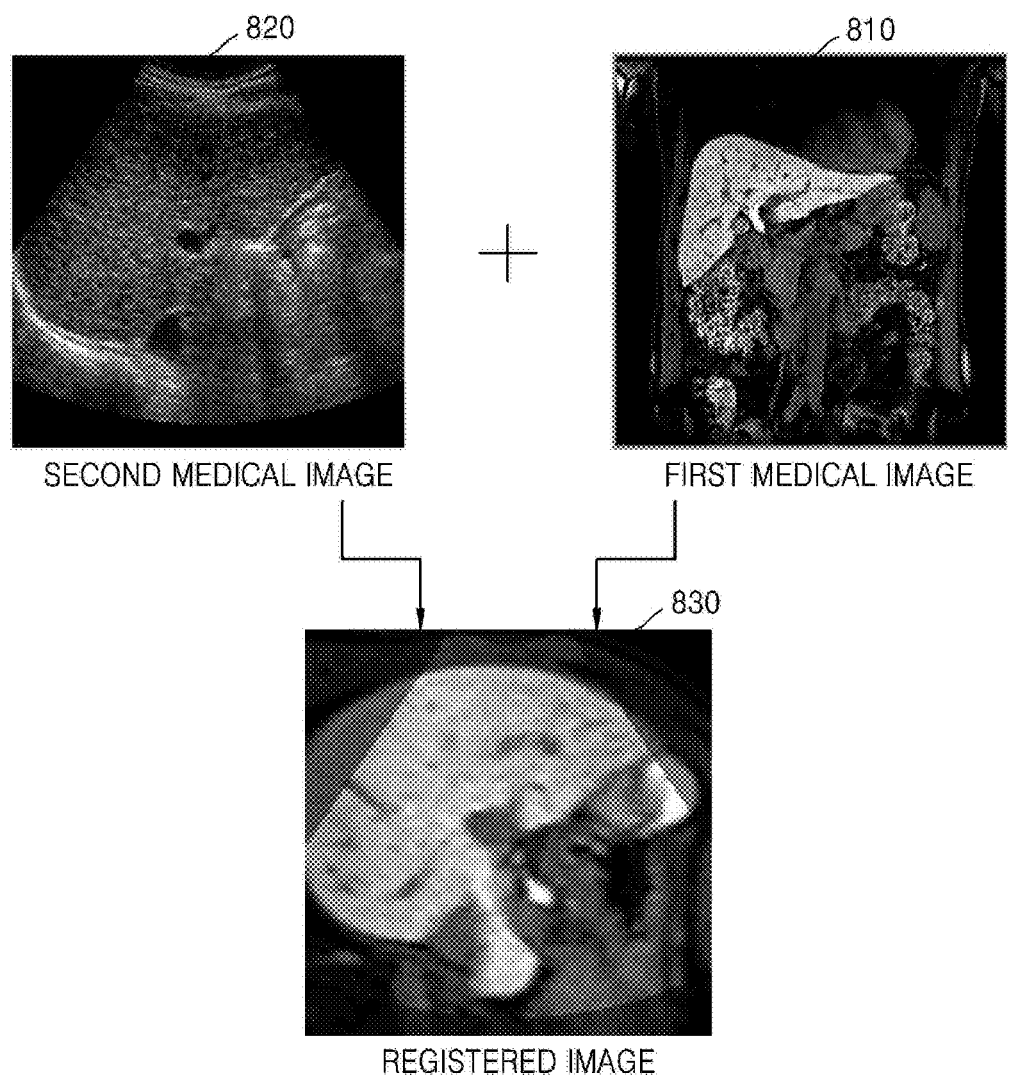
FIG. 8 is a diagram showing an example of an ultrasound image and a magnetic resonance (MR) image showing the liver region of a liver cancer patient and a medical image registered and output by an image registration device of FIG. 2.

FIG. 8 is a diagram showing an example of a magnetic resonance (MR) image and an ultrasound image showing the liver region of a liver cancer patient and a medical image registered and output by the image registration device of FIG. 2. Referring to FIG. 2, a first medical image 810 is an MR image showing the liver region of a liver cancer patient, a second medical image 820 is a ultrasound image showing the liver region of a liver cancer patient, and a registered image 830 is an image in which the first medical image 810 the second medical image 820 have been registered by the image registration device of FIG. 2.

As described above, landmark points may be extracted even from a medical image with an edge contrast that is too low to recognize anatomical characteristics of an organ to be observed, and the medical image may be quickly and precisely registered with another medical image based on the extracted landmark points.

The image registration device 130, the image registration device 200, the first medical image storage unit 210, the second medical image obtaining unit 220, the landmark point extracting unit 230, the adjacent anatomical object extracting unit 231, the coordinate extracting unit 232, the registration unit 240, the vector calculating unit 241, the matrix calculating unit 242, the basic registration unit 243, the boundary region selecting unit 244, the registered image correcting unit 245 described above that perform the operations illustrated in FIGS. 3-8 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device.

Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described therein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the detailed description.

What is claimed is:

1. A method of medical image registration, the method comprising:
   obtaining a first medical image;
   obtaining a second medical image generated in real time;
   extracting first landmark points of the first medical image and the second medical image from a first adjacent anatomical object recognizable in the second medical image among anatomical objects near an organ of interest;
   extracting second landmark points of the first medical image and the second medical image from a second adjacent anatomical object recognizable in the second medical image among anatomical objects near an organ of interest; and
   registering the first medical image and the second medical image by matching a coordinate system of the first medical image and a coordinate system of the second medical image based on a geometrical correlation among the adjacent anatomical objects indicated by the first and the second landmark points of the first medical image and a geometrical correlation among the adjacent anatomical objects indicated by the first and the second landmark points of the second medical image,
   wherein the matching of the coordinate system further comprises:
   selecting boundary regions indicating silhouettes of the adjacent anatomical objects in the first medical image and the second medical image based on a change of a brightness of voxels of the first medical image and the second medical image; and
   correcting a coordinate system of the first medical image or the second medical image based on a similarity between directions in which the brightness of the voxels increases and decreases in the boundary regions selected in the first medical image and the second medical image.

2. The method of claim 1, wherein the extracting of the landmark points comprises:
   extracting the first and the second landmark points of the first medical image and the second medical image from a centerline of a blood vessel near the organ of interest; and
   extracting the first and the second landmark points of the first medical image and the second medical image from points on a boundary surface of the organ of interest that are closest to the landmark points extracted from the centerline of the blood vessel.

3. The method of claim 1, wherein the registering of the first medical image and the second medical image comprises:
   calculating a first vector indicating the geometrical correlation among the adjacent anatomical objects using coordinates of the first and the second landmark points of the first medical image;
   calculating a second vector indicating the geometrical correlation among the adjacent anatomical objects using coordinates of the first and the second landmark points of the second medical image; and
   matching the coordinate system of the first medical image and a coordinate system of the second medical image based on a difference between the first vector and the second vector.

4. The method of claim 3, wherein the matching of the coordinate systems comprises:
   calculating a transformation matrix for transforming the first vector or the second vector so that the difference between the first vector and the second vector is less than or equal to a predetermined threshold value;
   matching the coordinate system of the first medical image and the coordinate system of the second medical image based on the transformation matrix; and
   performing at least one of scaling, moving and rotating the first medical image or the second medical image based on matched coordinates of the first medical image and the second medical image.

5. The method of claim 1, wherein the geometrical correlation among the adjacent anatomical objects comprises any one or any combination of a shape, an area, a volume, lengths of sides, and angles between sides of a polygon or a polyhedron formed by the first landmark points extracted from the first object and the second landmark points extracted from the second object.

6. The method of claim 1, wherein the organ of interest is a liver, a kidney, or a gall bladder; and
   the first and the second adjacent anatomical object comprises an anatomical object selected from the diaphragm, the inferior vena cava (IVC), the gall bladder, the liver, the hepatic portal vein, and the hepatic vein.

7. The method of claim 1, wherein the first medical image is a 3-dimensional (3D) magnetic resonance image (MRI), a computed tomography (CT) image, an X-ray image, or a positron emission tomography (PET) image showing the organ of interest and a lesion of the organ of interest; and
   the second medical image is a 3D ultrasound image having an edge contrast lower than an edge contrast of the first medical image.

8. A non-transitory computer-readable storage medium storing a computer program for controlling a computer to perform the method of claim 1.

9. An image registration apparatus for matching medical images, the imaging registration apparatus comprising:
a memory configured to store a first medical image, and computer-executable instructions; and
one or more processors configured to execute the computer-executable instructions such that the one or more processors are configured to:
obtain a second medical image in real time;
extract first landmark points of the first medical image and the second medical image from a first adjacent anatomical object recognizable in the second medical image among anatomical objects near an organ of interest, and extract second landmark points of the first medical image and the second medical image from a second adjacent anatomical object recognizable in the second medical image among anatomical objects near an organ of interest; and
register the first medical image and the second medical image by matching a coordinate system of the first medical image and a coordinate system of the second medical image based on a geometrical correlation among the adjacent anatomical objects indicated by the first and the second landmark points of the first medical image and a geometrical correlation among the adjacent anatomical objects indicated by the first and the second landmark points of the second medical image,
wherein the one or more processors are further configured to:
select boundary regions indicating silhouettes of the adjacent anatomical objects in the first medical image and the second medical image based on a change of a brightness of voxels of the first medical image and the second medical image; and
correct a coordinate system of the first medical image or the second medical image based on a similarity between directions in which the brightness of the voxels increases and decreases in the boundary regions selected in the first medical image and the second medical image.

10. The image registration apparatus of claim 9, wherein the one or more processors are further configured to extract the first and the second landmark points of the first medical image and the second medical image from a centerline of a blood vessel near the organ of interest, and extract the first and the second landmark points of the first medical image and the second medical image from points on a boundary surface of the organ of interest that are closest to the landmark points extracted from the centerline of the blood vessel.

11. The image registration apparatus of claim 9, wherein the one or more processors are further configured to:
calculate a first vector indicating the geometrical correlation among the adjacent anatomical objects using coordinates of the first and the second landmark points of the first medical image, and calculate a second vector indicating the geometrical correlation among the adjacent anatomical objects using coordinates of the first and the second landmark points of the second medical image; and
match the coordinate system of the first medical image and a coordinate system of the second medical image based on a difference between the first vector and the second vector.

12. The image registration apparatus of claim 11, wherein the one or more processors are further configured to:
calculate a transformation matrix for transforming the first vector or the second vector so that the difference between the first vector and the second vector is less than or equal to a predetermined threshold value; and
match the coordinate system of the first medical image and the coordinate system of the second medical image based on the transformation matrix, and perform at least one of scaling, moving and rotating the first medical image or the second medical image based on matched coordinates of the first medical image and the second medical image.

13. The image registration apparatus of claim 9, wherein the geometrical correlation among the adjacent anatomical objects comprises any one or any combination of a shape, an area, a volume, lengths of sides, and angles between sides of a polygon or a polyhedron formed by the first landmark points extracted from the first object and the second landmark points extracted from the second object.

14. The image registration apparatus of claim 9, wherein the organ of interest is a liver, a kidney, or a gall bladder, and
the first and the second adjacent anatomical object comprises an anatomical object selected from the diaphragm, the inferior vena cava (IVC), the gall bladder, the liver, the hepatic portal vein, and the hepatic vein.

15. The image registration apparatus of claim 9, wherein the first medical image is a 3-dimensional (3D) magnetic resonance image (MRI), a computed tomography (CT) image, an X-ray image, or a positron emission tomography (PET) image showing the organ of interest and a lesion of the organ of interest; and
the second medical image is a 3D ultrasound image having an edge contrast lower than an edge contrast of the first medical image.

16. The image registration apparatus of claim 15, wherein the second medical image does not show either one or both of the organ of interest and the lesion of the organ of interest.

17. An image registration apparatus for matching medical images, the imaging registration apparatus comprising:
a memory configured to store a first medical image generated before a medical surgery, and computer-executable instructions; and
one or more processors configured to execute the computer-executable instructions such that the one or more processors are configured to:
obtain a second medical image in real time during the medical surgery;
extract landmark points of the first medical image and the second medical image from an adjacent anatomical object recognizable in the second medical image among anatomical objects near an organ of interest; and
register the first medical image and the second medical image based on a geometrical correlation among the adjacent anatomical objects indicated by the landmark points of the first medical image and a geometrical correlation among the adjacent anatomical objects indicated by the landmark points of the second medical image,
wherein the one or more processors are further configured to:
select boundary regions indicating silhouettes of the adjacent anatomical objects in the first medical image and the second medical image based on a change of a brightness of voxels of the first medical image and the second medical image; and
correct the coordinate system of the first medical image or the second medical image based on a similarity between directions in which the brightness of the voxels increases and decreases in the boundary regions selected in the first medical image and the second medical image.

* * * * *